(12) United States Patent
Lee et al.

(10) Patent No.: US 11,649,521 B2
(45) Date of Patent: May 16, 2023

(54) HOT STAMPING COMPONENT AND MANUFACTURING METHOD THEREOF

(71) Applicants: HYUNDAI MOTOR COMPANY, Seoul (KR); KIA CORPORATION, Seoul (KR)

(72) Inventors: Chang-Wook Lee, Anyang-si (KR); Yeon-Jung Hwang, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/314,927

(22) Filed: May 7, 2021

(65) Prior Publication Data

US 2022/0162722 A1    May 26, 2022

(30) Foreign Application Priority Data

Nov. 25, 2020   (KR) .................. KR10-2020-0160409

(51) Int. Cl.

| | | |
|---|---|---|
| *C21D 9/48* | (2006.01) | |
| *C21D 6/00* | (2006.01) | |
| *B32B 15/01* | (2006.01) | |
| *C22C 38/32* | (2006.01) | |
| *C22C 38/28* | (2006.01) | |
| *C22C 38/04* | (2006.01) | |
| *C22C 38/02* | (2006.01) | |
| *C22C 38/00* | (2006.01) | |
| *B21D 22/02* | (2006.01) | |

(52) U.S. Cl.
CPC .............. *C21D 9/48* (2013.01); *B21D 22/02* (2013.01); *B32B 15/012* (2013.01); *C21D 6/002* (2013.01); *C21D 6/005* (2013.01); *C21D 6/008* (2013.01); *C22C 38/002* (2013.01); *C22C 38/02* (2013.01); *C22C 38/04* (2013.01); *C22C 38/28* (2013.01); *C22C 38/32* (2013.01); *C21D 2211/001* (2013.01)

(58) Field of Classification Search
CPC . B21D 22/02; B32B 15/012; C21D 2211/001; C21D 6/002; C21D 6/005; C21D 6/008; C21D 9/48; C22C 38/002; C22C 38/02; C22C 38/04; C22C 38/28; C22C 38/32
See application file for complete search history.

(56) References Cited

U.S. PATENT DOCUMENTS

| | | |
|---|---|---|
| 8,307,680 B2 | 11/2012 | Drillet et al. |
| 9,708,683 B2 | 7/2017 | Drillet et al. |
| 10,550,447 B2 | 2/2020 | Drillet et al. |
| 10,577,674 B2 | 3/2020 | Drillet et al. |
| 10,590,507 B2 | 3/2020 | Drillet et al. |
| 10,597,747 B2 | 3/2020 | Drillet et al. |
| 10,961,602 B2 | 3/2021 | Drillet et al. |
| 2011/0165436 A1 | 7/2011 | Drillet et al. |
| 2013/0029172 A1 | 1/2013 | Drillet et al. |
| 2017/0260603 A1 | 9/2017 | Drillet et al. |
| 2019/0271055 A1 | 9/2019 | Drillet et al. |
| 2019/0271056 A1 | 9/2019 | Drillet et al. |
| 2019/0271057 A1 | 9/2019 | Drillet et al. |
| 2019/0271058 A1 | 9/2019 | Drillet et al. |
| 2019/0276912 A1 | 9/2019 | Drillet et al. |

FOREIGN PATENT DOCUMENTS

| | | | | |
|---|---|---|---|---|
| EP | 2581465 A1 | * | 4/2013 | ............ B21B 1/026 |
| JP | 2013147750 A | * | 8/2013 | |
| JP | 2013147750 A | | 8/2013 | |
| KR | 101327648 B1 | | 11/2013 | |
| KR | 102110679 B1 | | 5/2020 | |

* cited by examiner

*Primary Examiner* — Jenny R Wu
(74) *Attorney, Agent, or Firm* — Lempia Summerfield Katz LLC

(57) ABSTRACT

A hot stamping component and a manufacturing method thereof include: (a) preparing a blank including 0.27 to 0.33 wt % of carbon (C), more than 0 and 0.40 wt % or less of silicon (Si), 1.10 to 1.60 wt % of manganese (Mn), more than 0 and 0.030 wt % or less of phosphorus (P), more than 0 and 0.015 wt % or less of sulfur (S), 0.10 to 0.60 wt % of chromium (Cr), more than 0 and 0.1 wt % or less of titanium (Ti), and 0.0008 to 0.0050 wt % of boron (B); (b) heat-treating the blank; and (c) molding the heat-treated blank and cooling the molded blank. The component and method may stably provide high strength by minimizing hydrogen charging in a hot stamping manufacturing process and preventing hydrogen delayed fracture due to the hydrogen charging.

7 Claims, 3 Drawing Sheets

HOT STAMPING COMPONENT AND MANUFACTURING METHOD THEREOF

CROSS-REFERENCE TO RELATED APPLICATIONS

This application claims priority under 35 U.S.C. § 119 to Korean Patent Application No. 10-2020-0160409, filed on Nov. 25, 2020, in the Korean Intellectual Property Office, the disclosure of which is incorporated herein by reference in its entirety.

BACKGROUND

1. Field of the Disclosure

The present disclosure relates to a hot stamping component and a manufacturing method thereof, and more particularly, to a hot stamping component having high tensile strength by minimizing hydrogen embrittlement and a manufacturing method thereof.

2. Description of the Related Art

In the global automobile market, ultra-high-strength components allow for improved fuel efficiency and increased passenger safety. Thus, the automobile industry is leading the development of ultra-high-strength steel for automobiles, reflecting the demand of the automobile market in response to the trend of weight reduction of automobile bodies and strengthening of crash regulations. Accordingly, there is a tendency that the application rate of hot stamping steel is steadily increasing, and research and development has been conducted on high toughness and high strength.

However, during a hot stamping process, there is a problem in that hydrogen is charged and hydrogen delayed fracture occurs due to the hydrogen charging, so that it is not possible to apply the hot stamping steel to the car body without solving such hydrogen embrittlement.

SUMMARY

The present disclosure has been made in an effort to provide a hot stamping component having hydrogen embrittlement resistance and high tensile strength and a manufacturing method thereof.

An embodiment of the present disclosure provides a hot stamping component including 0.27 to 0.33 wt % of carbon (C), more than 0 and 0.40 wt % or less of silicon (Si), 1.10 to 1.60 wt % of manganese (Mn), more than 0 and 0.030 wt % or less of phosphorus (P), more than 0 and 0.015 wt % or less of sulfur (S), 0.10 to 0.60 wt % of chromium (Cr), more than 0 and 0.1 wt % or less of titanium (Ti), and 0.0008 to 0.0050 wt % of boron (B), in which a tensile strength is 1.5 GPa or more.

Another embodiment of the present disclosure provides a method for manufacturing a hot stamping component. The method includes: (a) preparing a blank including 0.27 to 0.33 wt % of carbon (C), more than 0 and 0.40 wt % or less of silicon (Si), 1.10 to 1.60 wt % of manganese (Mn), more than 0 and 0.030 wt % or less of phosphorus (P), more than 0 and 0.015 wt % or less of sulfur (S), 0.10 to 0.60 wt % of chromium (Cr), more than 0 and 0.1 wt % or less of titanium (Ti), and 0.0008 to 0.0050 wt % of boron (B); (b) heat-treating the blank; and (c) molding the heat-treated blank and cooling the molded blank.

The hot stamping component includes an aluminum-silicon (Al—Si) plated layer, and a diffusion layer fraction of the following [Equation 1] may be less than 60%.

$$\text{Fraction (\%) of Diffusion Layer} = \frac{\text{Thickness of Diffusion Layer}}{\text{Total Thickness of Plating Layer}} \times 100 \quad \text{[Equation 1]}$$

In the hot stamping component, a matrix may have a prior austenite grain size of 23 μm or less.

Step (b) in the method for manufacturing a hot stamping component may warm the blank at a rate of 4 to 12° C./s and heat-treat the blank at 830 to 880° C. for 3 to 20 minutes.

Step (b) in the method for manufacturing a hot stamping component may maintain a dew point of a heating furnace at −5° C. or less.

Step (c) in the method for manufacturing a hot stamping component may include laser trimming.

In Step (c) in the method for manufacturing a hot stamping component, an average cooling rate may be at least 10° C./s.

The hot stamping component manufactured by the method for manufacturing a hot stamping component includes an Al—Si plated layer (element 20 in FIG. 1), and a diffusion layer fraction defined by Equation 1, above, may be less than 60%.

In the hot stamping component manufactured by the method for manufacturing a hot stamping component, a matrix may have a prior austenite grain size of 23 μm or less.

DETAILED DESCRIPTION OF THE EMBODIMENTS

Figure 1:
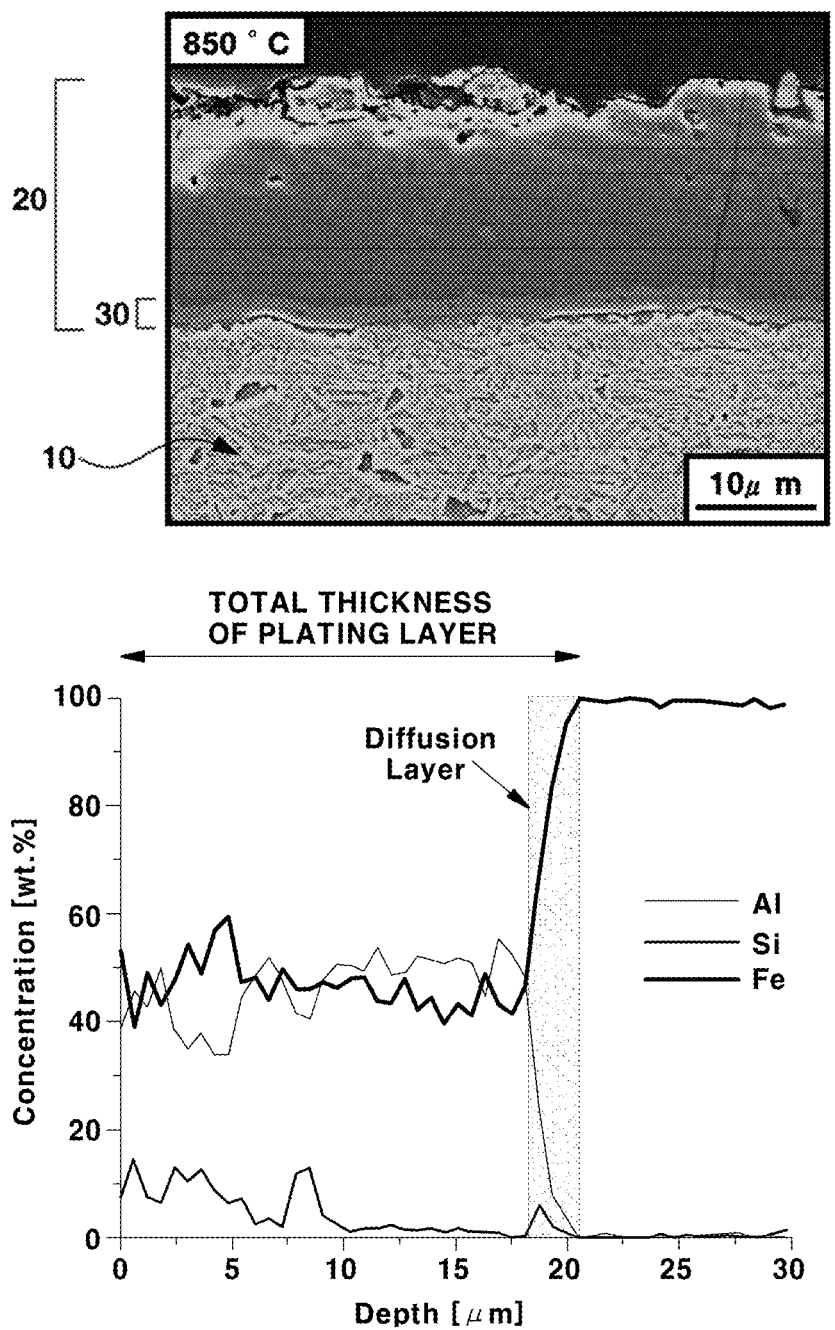
FIG. 1 illustrates a photograph in which a microstructure of a sample prepared according to Example 1 of the present disclosure is observed and a graph of distribution of a plating layer and a diffusion layer.

Hereinafter, a hot stamping part of the present disclosure and a manufacturing method thereof is described in detail with reference to the accompanying drawings.

However, the disclosed drawings are provided as an example for enabling the spirit of the present disclosure to be sufficiently transferred to a person having ordinary skill in the art. Accordingly, the present disclosure is not limited to the drawings suggested below and may also be embodied as another embodiment.

Unless otherwise defined, the terms used in the specification of the present disclosure have meanings typically understood by a person with ordinary skill in the art to which the present disclosure pertains. The detailed description on the publicly known functions and configurations, which may unnecessarily obscure the gist of the present disclosure, have been omitted from the following description and accompanying drawings.

The hot stamping component according to an embodiment of the present disclosure includes 0.27 to 0.33 wt % of carbon (C), more than 0 and 0.40 wt % or less of silicon (Si), 1.10 to 1.60 wt % of manganese (Mn), more than 0 and 0.030 wt % or less of phosphorus (P), more than 0 and 0.015 wt % or less of sulfur (S), 0.10 to 0.60 wt % of chromium (Cr), more than 0 and 0.1 wt % or less of titanium (Ti), and 0.0008 to 0.0050 wt % of boron (B), in which a tensile strength is 1.5 GPa or more.

Carbon (C) is a main element which determines the strength and hardness of steel, and is added for the purpose of securing the tensile strength of a steel material after a hot stamping process. Carbon (C) may be added in an amount of 0.27 to 0.33 wt % based on the total weight of the hot stamping component according to an embodiment of the present disclosure. When carbon (C) is added in an amount of less than 0.27 wt %, it may be difficult to secure sufficient strength, and when carbon (C) is added in an amount of more than 0.33 wt %, the hydrogen embrittlement may be reduced.

Silicon (Si) is an element effective for strengthening steel and improving ductility, and serves to suppress the production of cementite, which is the starting point of cracks due to hydrogen embrittlement. Silicon (Si) may be added at a content ratio of more than 0 and 0.40 wt % or less based on the total weight of the hot stamping component according to an embodiment of the present disclosure, and when the content of silicon (Si) is more than 0.40 wt %, the calcinability may deteriorate, the weldability of steel may deteriorate, and the plating characteristics may deteriorate.

Manganese (Mn) is added for the purpose of increasing hardenability and strength during heat treatment. Manganese (Mn) may be added in an amount of 1.10 to 1.60 wt % based on the total weight of the hot stamping component according to an embodiment of the present disclosure. When the content of manganese (Mn) is less than 1.10 wt %, the crystal grain refinement effect is insufficient. In contrast, when the content of manganese (Mn) is more than 1.60 wt %, there are problems in that the toughness deteriorates due to the occurrence of manganese segregation in the central portion, and the content is disadvantageous in terms of cost.

Phosphorus (P) is an element which easily causes segregation, and an element which inhibits the toughness of steel. Phosphorus (P) may be added at a content ratio of more than 0 and 0.030 wt % or less based on the total weight of the hot stamping component according to an embodiment of the present disclosure. When the content of phosphorus (P) is more than 0.030 wt %, martensite grain boundaries may be destroyed, cracks may be induced during the process, and iron (Fe) phosphide compounds may be formed to reduce toughness.

Sulfur (S) is an element which inhibits processability and physical properties. Sulfur (S) may be added at a content ratio of more than 0 and 0.015 wt % or less based on the total ratio of the hot stamping component according to an embodiment of the present disclosure. When sulfur (S) is included in an amount more than 0.015 wt %, martensite grain boundaries may be destroyed, hot workability may deteriorate, and surface defects such as cracks may occur due to the production of large inclusions.

Chromium (Cr) is added for the purpose of improving the hardenability and strength of the steel material. In some cases, chromium (Cr) may be added at a content ratio of 0.10 to 0.60 wt % based on the total weight of the hot stamping component according to an embodiment of the present disclosure. When the content of chromium (Cr) is less than 0.10 wt %, the effect of improving hardenability and strength is insufficient. In contrast, there is a problem in that when the content of chromium (Cr) is more than 0.60 wt %, the toughness deteriorates.

Titanium (Ti) is added for the purpose of enhancing hardenability by forming precipitates and improving the material after hot-stamping heat treatment, and is added for the purpose of increasing strength and toughness according to the reduction in martensite packet size. In some cases, titanium (Ti) may be added at a content ratio of more than 0 and 0.1 wt % or less based on the total weight of the hot stamping component according to an embodiment of the present disclosure. When the content of titanium (Ti) is more than 0.1 wt %, there is a risk of a decrease in the elongation, which may lead to a decrease in toughness.

Boron (B) is added for the purpose of securing soft martensitic hardenability and refining the crystal grains. In some cases, boron (B) may be added at a content ratio of 0.0008 to 0.0050 wt % based on the total weight of the hot stamping component according to an embodiment of the present disclosure. When the content of boron (b) is less than 0.0008 wt %, the effect of improving hardenability is insufficient. In contrast, there is a problem in that when the content of boron (B) is 0.0050 wt %, an embrittlement risk and an elongation deterioration risk are increased.

The hot stamping component according to an embodiment of the present disclosure having the alloy element composition as described above includes an Al—Si plated layer 20, and the fraction of the diffusion layer (element 30 in FIG. 1) defined by Equation 1 above may be less than 60%.

The thickness of the diffusion layer 30 of the plating layer 20 and the prior austenite grain size of the matrix are associated with the presence or absence of hydrogen delayed fracture. Therefore, in order to provide a hot stamping component having a tensile strength of 1.5 GPa or more, the degree of alloying of the plating layer 20 and the prior austenite grain size of the matrix may be controlled.

Hydrogen entering the hot stamping steel material not only enters the barrier of the plating layer 20, but the proportion of the diffusion layer 30 in the plating is increased as the alloying progresses. The plating layer 20 is composed of FeAl, $Fe_3Al$, and $\alpha$-Fe(Al) having a high Fe content, and the Fe content in the plating is increased as the proportion of the diffusion layer 30 in the plating layer 20 is increased. When Fe-rich phases with a high degree of hydrogen solid solution are disposed on the surface, the amount of diffusible hydrogen is increased locally after a hot-stamping heat treatment. Therefore, the embrittlement of the surface becomes strong, so that the time point when stress is applied may become a time point when cracks occur. Further, the crystal structure of the diffusion layer 30 is $DO_3$ or body centered cubic (BCC), which is similar to the body-centered tetragonal (BCT) structure of the matrix martensite, so that crack propagation may be continuously and rapidly increased.

Therefore, in consideration of the hydrogen embrittlement as described above, the hot stamping component according to the present disclosure may have a fraction of a diffusion layer 30 defined by [Equation 1] of less than 60%.

Meanwhile, the higher prior austenite grain size of the matrix becomes more vulnerable to crack propagation. Since cracks of hydrogen embrittlement propagate according to the prior austenite grain size, cracks rapidly propagate when the grain boundaries are large, and cracks slowly propagate when the grain boundaries are small. In consideration of these circumstances, in the hot stamping component of the present disclosure, a matrix may have a prior austenite grain size of 23 μm or less.

Hereinafter, the method for manufacturing a hot stamping component according to an embodiment of the present disclosure, which has the above-described alloy element composition, is described.

The method for manufacturing a hot stamping component of the present disclosure includes: (a) preparing a blank including 0.27 to 0.33 wt % of carbon (C), more than 0 and 0.40 wt % or less of silicon (Si), 1.10 to 1.60 wt % of manganese (Mn), more than 0 and 0.030 wt % or less of phosphorus (P), more than 0 and 0.015 wt % or less of sulfur (S), 0.10 to 0.60 wt % of chromium (Cr), more than 0 and 0.1 wt % or less of titanium (Ti), and 0.0008 to 0.0050 wt % of boron (B); (b) heat-treating the blank; and (c) molding the heat-treated blank and cooling the molded blank.

The hot stamping component according to the method for manufacturing a hot stamping component of the present disclosure includes an Al—Si plated layer 20, and the thickness of the diffusion layer 30 of the plated layer 20 and the prior austenite grain size of the matrix are associated with whether hydrogen delayed fracture occurs. Therefore, in order to provide a hot stamping component having a tensile strength of 1.5 GPa or more, the degree of alloying of the plating layer 20 and the prior austenite grain size of the matrix during the manufacturing process may be controlled.

The method for manufacturing a hot stamping component of the present disclosure may warm the blank prepared in step (a) at a rate of 4 to 12° C./s and heat-treat the blank prepared in step (a) at 830 to 880° C. for 3 to 20 minutes in step (b).

The heat treatment temperature and time are particularly important in order to control the fraction of the diffusion layer 30 of the plating layer 20 described above and the prior austenite grain size of the matrix. The lower the heat treatment temperature is, the slower the diffusion rate is, and the shorter the heat treatment time is, the smaller the diffusion amount is. For this purpose, the blank is warmed at a rate of 4 to 12° C./s, and the blank may also be heat-treated in consideration of the transformation point for providing a hot stamped steel of 1.5 GPa, but the structure may be composed of full austenite at high temperature only when the heat treatment is performed at 830 to 880° C., and may be transformed into full martensite during quenching to provide a tensile strength of 1.5 GPa. Furthermore, in order to stably produce components on a mass production line, a heat treatment may be performed for at least 3 minutes, and the heat treatment may be performed within up to 20 minutes in consideration of the fraction of the diffusion layer 30 of the plating layer 20 and the prior austenite grain size of the matrix.

The dew point of a heating furnace may be maintained at −5° C. or less during the heat treatment. The amount of hydrogen charged may be reduced when the amount of moisture in the heating furnace is reduced by controlling the dew point of the heating furnace.

The dew point control is an essential process condition for preventing hydrogen embrittlement. In particular, there are four seasons in Korea and the weather is humid particularly in the summer, so that the amount of hydrogen charged into steel cannot be adjusted when the humidity cannot be controlled in the heating furnace. Since the moisture present in the heating furnace is a source of hydrogen which causes hydrogen delayed fracture, it is essential to control moisture at a certain level.

The blank is heat-treated, and then cooled as described above. However, in consideration of the fraction of the diffusion layer 30 of the plating layer 20 and the prior austenite grain size of the matrix, the average cooling rate may be at least 10° C. until the temperature becomes a cooling temperature. The cooling temperature may be 400 to 550° C.

Trimming which removes excess other than a product which is present after cooling the component molded in step (C) above may be performed, trimming may be performed using milling or laser, and a trimming which is the safest for hydrogen embrittlement is a laser trimming which does not apply stress to the cut surface. In the case of sharing trimming, cracks may occur on the sharing surface, and when stress is applied in this state, cracks occur extremely quickly. In the case of milling, hydrogen delayed fracture does not occur, but it may be difficult to apply the method of trimming a component.

The hot stamping component of the present disclosure manufactured through such a process has improved hydrogen embrittlement resistance and may provide a tensile strength of 1.5 GPa or more.

Hereinafter, the present disclosure is described in detail through examples. The scope of the present disclosure is not limited by the scope of description of such examples. Since contents not described herein can be sufficiently technically inferred by those with ordinary skill in the art, descriptions thereof may be omitted.

EXAMPLE

A blank for hot stamping, which had an alloy composition of 0.27 to 0.33 wt % of carbon (C), more than 0 and 0.40 wt % or less of silicon (Si), 1.10 to 1.60 wt % of manganese (Mn), more than 0 and 0.030 wt % or less of phosphorus (P), more than 0 and 0.015 wt % or less of sulfur (S), 0.10 to 0.60 wt % of chromium (Cr), more than 0 and 0.1 wt % or less of titanium (Ti), and 0.0008 to 0.0050 wt % of boron (B), was manufactured, and the dew point temperature was set to −5° C. After the blank was warmed at a rate of 4 to 12° C./s and heat-treated at 830 to 880° C. for 3 to 20 minutes, the heated blank was transferred to a die, stamped in the die and cooled to an average cooling rate of at least 10° C./s until the temperature became 400° C. to manufacture a hot stamping component. A photograph in which a microstructure of Example 1 is observed and a graph of distribution of a plating layer 20 and a diffusion layer 30 are illustrated as in FIG. 1.

Comparative Example

Figure 2:
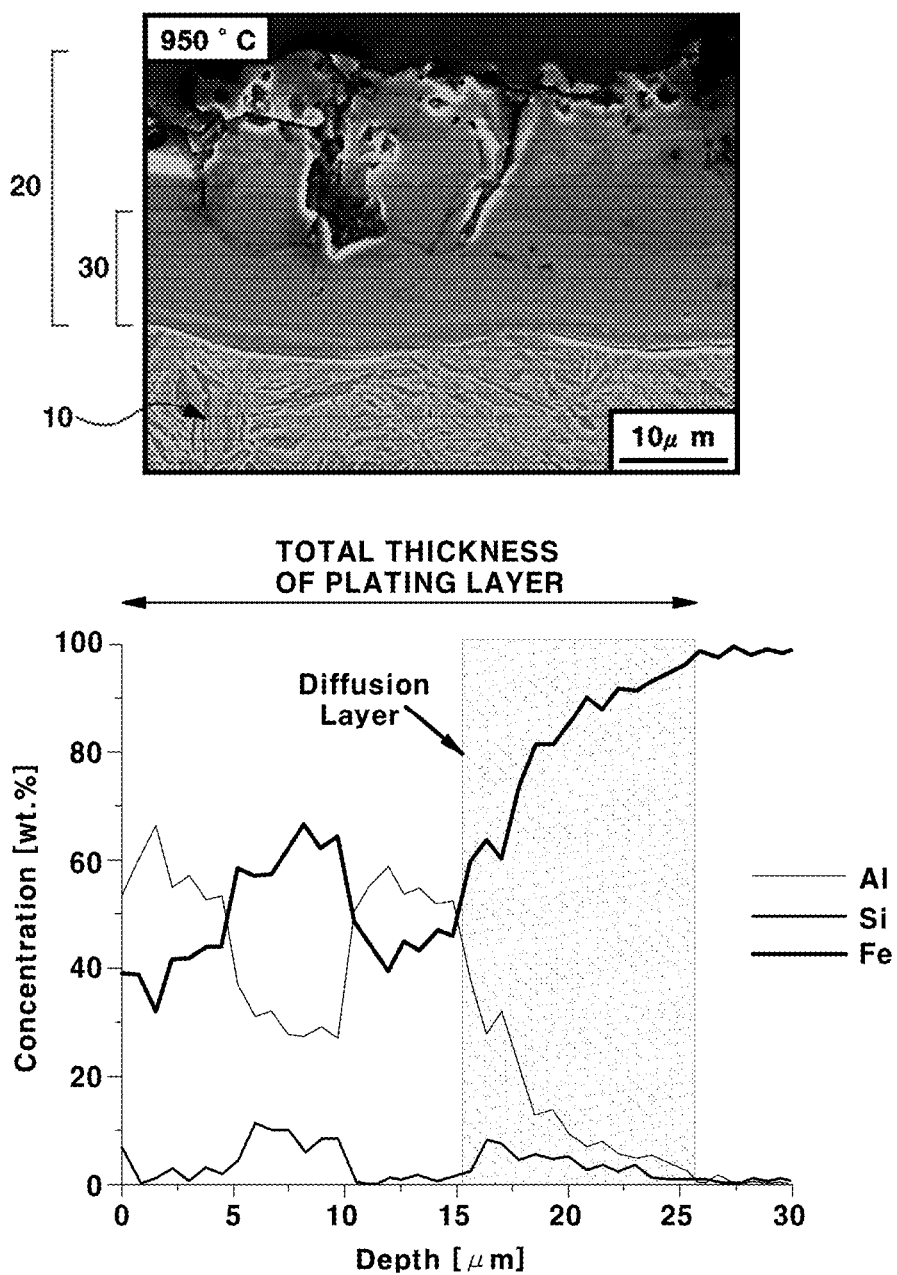
FIG. 2 illustrates a photograph in which a microstructure of a sample prepared according to Comparative Example 1 is observed and a graph of distribution of a plating layer and a diffusion layer.

In the above example, the heating temperature was set to 900 to 950° C., and the hot stamping component was manufactured by cooling the blank at an average cooling rate of at least 30° C./s during the cooling. A photograph in which a microstructure of the prepared sample is observed is illustrated as in FIG. 2.

Experimental Example 1

Figure 3:
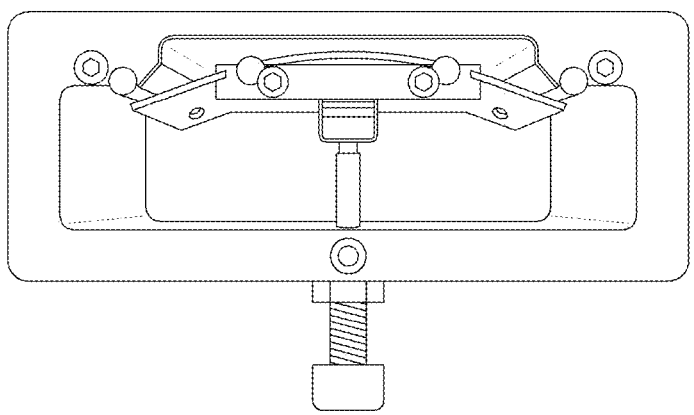
FIG. 3 illustrates a photograph of a 4-point bending test measuring device for evaluating hydrogen delayed fracture of samples prepared according to an example and a comparative example of the present disclosure.

The total thickness of the plating layer 20 and the thickness of the diffusion layer 30 of the samples prepared in the above Example and Comparative Example, the fraction of the diffusion layer 30 associated therewith, and whether hydrogen delayed fracture occurs are shown in the following Table 1. The hydrogen delayed fracture was evaluated by a 4-point bending test as illustrated in FIG. 3.

TABLE 1

| Classification | Thickness (μm) of diffusion layer | Total thickness (μm) of plating layer | Fraction (%) of diffusion layer | Whether hydrogen delayed fracture occurs |
|---|---|---|---|---|
| Example 1 | 2 | 21 | 9.5 | Not occurred |
| Example 2 | 7.5 | 25.9 | 29 | Not occurred |
| Example 3 | 9.1 | 26.8 | 34 | Not occurred |
| Example 4 | 9.2 | 27.1 | 34 | Not occurred |
| Example 5 | 10.7 | 26.8 | 40 | Not occurred |
| Example 6 | 11.4 | 26.5 | 43 | Not occurred |
| Example 7 | 13.3 | 27.1 | 49 | Not occurred |
| Example 8 | 15.0 | 32.6 | 46 | Not occurred |
| Comparative Example 1 | 10 | 26 | 38.5 | Occurred |
| Comparative Example 2 | 18.4 | 30.7 | 60 | Occurred |
| Comparative Example 3 | 19.0 | 31.7 | 60 | Occurred |
| Comparative Example 4 | 21.8 | 35.2 | 62 | Occurred |
| Comparative Example 5 | 37.1 | 40.8 | 91 | Occurred |
| Comparative Example 6 | 38.0 | 39.6 | 96 | Occurred |

Experimental Example 2

The prior austenite grain sizes of the matrices of the samples prepared in the Example and Comparative Example and whether hydrogen delayed fracture occurred are shown in the following Table 2. The hydrogen delayed fracture was evaluated by a 4-point bending test as illustrated in FIG. 3.

TABLE 2

| Classification | Prior Austenite Grain Size (μm) | Whether hydrogen delayed fracture occurs |
|---|---|---|
| Example 9 | 9.66 | Not occurred |
| Example 10 | 11.32 | Not occurred |
| Example 11 | 12.87 | Not occurred |
| Example 12 | 14.32 | Not occurred |
| Example 13 | 16.62 | Not occurred |
| Example 14 | 20.63 | Not occurred |
| Example 15 | 22.39 | Not occurred |
| Comparative Example 7 | 23.71 | Occurred |
| Comparative Example 8 | 28.12 | Occurred |
| Comparative Example 9 | 29.02 | Occurred |
| Comparative Example 10 | 31.42 | Occurred |

Experimental Example 3

Figure 4:
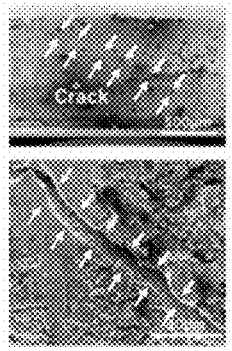
FIG. 4 illustrates photographs of the cross-sections of samples prepared according to an example and a comparative example of the present disclosure by a trimming method and photographs of cross-sections of the samples after a 4-point bending test.

The samples manufactured in the above Example and Comparative Example were trimmed differently as shown in the following Table 3, and the results are shown in the following Table 3 and FIG. 4. The hydrogen delayed fracture was evaluated by a 4-point bending test as illustrated in FIG. 3.

TABLE 3

| Classification | Trimming method | Whether hydrogen delayed fracture occurs |
|---|---|---|
| Example 16 | Laser | Not occurred |
| Example 17 | Milling | Not occurred |
| Comparative Example 11 | Shearing | Occurred |

Experimental Example 4

Whether hydrogen delayed fracture of the samples prepared by setting the heat treatment temperature as in Table 4 below in the above Example and Comparative Example occurred is shown. The hydrogen delayed fracture was evaluated by a 4-point bending test as illustrated in FIG. 3.

TABLE 4

| Classification | Heat treatment temperature (° C.) | Heat treatment time (min) | Whether hydrogen delayed fracture occurs |
|---|---|---|---|
| Example 18 | 870 | 5 | Not occurred |
| Example 19 | 870 | 10 | Not occurred |
| Example 20 | 870 | 20 | Not occurred |
| Comparative Example 12 | 900 | 20 | Occurred |
| Comparative Example 13 | 930 | 10 | Occurred |
| Comparative Example 14 | 930 | 20 | Occurred |
| Comparative Example 15 | 950 | 10 | Occurred |
| Comparative Example 16 | 950 | 20 | Occurred |

The hot stamping component of the present disclosure having the aforementioned configuration and the manufacturing method thereof exhibit an effect capable of stably providing high strength by minimizing hydrogen charging in a hot stamping manufacturing process and preventing hydrogen delayed fracture due to the hydrogen charging.

What is claimed is:
1. A hot stamping component comprising:
0.27 to 0.33 wt % of carbon (C);
more than 0 and 0.40 wt % or less of silicon (Si);
1.10 to 1.60 wt % of manganese (Mn);
more than 0 and 0.030 wt % or less of phosphorus (P);
more than 0 and 0.015 wt % or less of sulfur (S);
0.10 to 0.60 wt % of chromium (Cr);
more than 0 and 0.1 wt % or less of titanium (Ti); and
0.0008 to 0.0050 wt % of boron (B);
wherein the hot stamping component has a tensile strength is 1.5 GPa or more,
wherein the hot stamping component comprises an Al—Si plating layer having a diffusion layer,
wherein a fraction of the diffusion layer of the plating layer is in a range of 9.5 to 49% as defined by the following equation:

$$\text{Fraction (\%) of Diffusion Layer} = \frac{\text{Thickness of Diffusion Layer}}{\text{Total Thickness of Plating Layer}} \times 100,$$

wherein the thickness of the diffusion layer is in a range of 2 to 15 micrometers (μm), wherein the total thickness of the plating layer is in a range of 21 to 27.1 μm, and wherein a matrix has a prior austenite grain size of 23 μm or less.

2. The hot stamping component of claim 1, wherein the hot stamping component is configured to avoid hydrogen delayed fracture in comparison to a hot stamping component that does not have a fraction of the diffusion layer of the plating layer in a range of 9.5 to 49%, a thickness of the diffusion layer in a range of 2 to 15 μm, a total thickness of the plating layer in a range of 21 to 27.1 μm, and a matrix having a prior austenite grain size of 23 μm or less.

3. A method for manufacturing a hot stamping component, the method comprising:

preparing a blank comprising 0.27 to 0.33 wt % of carbon (C), more than 0 and 0.40 wt % or less of silicon (Si), 1.10 to 1.60 wt % of manganese (Mn), more than 0 and 0.030 wt % or less of phosphorus (P), more than 0 and 0.015 wt % or less of sulfur (S), 0.10 to 0.60 wt % of chromium (Cr), more than 0 and 0.1 wt % or less of titanium (Ti), and 0.0008 to 0.0050 wt % of boron (B);

heat-treating the blank; and molding the heat-treated blank and cooling the molded blank to form the hot stamping component, wherein the hot stamping component has a tensile strength is 1.5 GPa or more, wherein the hot stamping component comprises an Al—Si plating layer having a diffusion layer, wherein a fraction of the diffusion layer of the plating layer is in a range of 9.5 to 49% as defined by the following equation:

$$\text{Fraction (\%) of Diffusion Layer} = \frac{\text{Thickness of Diffusion Layer}}{\text{Total Thickness of Plating Layer}} \times 100,$$

wherein the thickness of the diffusion layer is in a range of 2 to 15 micrometers (μm), wherein the total thickness of the plating layer is in a range of 21 to 27.1 μm, and wherein a matrix has a prior austenite grain size of 23 μm or less.

4. The method of claim 3, wherein the heat-treating of the blank comprises warming the blank at a rate of 4 to 12° C./s and heat-treating the blank at 830 to 880° C. for 3 to 20 minutes.

5. The method of claim 3, wherein, in the heat-treating of the blank, a dew point of a heating furnace at −5° C. or less is maintained.

6. The method of claim 3, wherein the molding of the heat-treated blank comprises laser trimming.

7. The method of claim 3, wherein, in the molding of the heat-treated blank, an average cooling rate is at least 10° C./s.

* * * * *